United States Patent [19]

Lowery et al.

[11] Patent Number: 4,804,496

[45] Date of Patent: Feb. 14, 1989

[54] RAPIDLY DISPERSIBLE COMPOSITIONS OF ANTIMONY PENTOXIDE

[75] Inventors: Richard E. Lowery, Tulsa; Denton C. Fentress, Pawhuska; Don W. Godbehere, Ochelata, all of Okla.

[73] Assignee: Phillips Petroleum Company, Bartlesville, Okla.

[21] Appl. No.: 26,234

[22] Filed: Mar. 16, 1987

[51] Int. Cl.$^4$ .............. B01F 3/12; B01J 13/00; C01G 30/00; F26B 3/12
[52] U.S. Cl. ................... 252/363.5; 252/313.1; 423/87; 423/88; 423/617; 34/5; 34/57 R
[58] Field of Search ............ 252/363.5, 313.1; 423/617, 87, 88; 34/5, 57 R

[56] References Cited

U.S. PATENT DOCUMENTS

| | | | |
|---|---|---|---|
| 3,418,147 | 12/1968 | Fields | 106/308 B |
| 4,022,710 | 5/1977 | Kobashi et al. | 252/313.1 |
| 4,026,819 | 5/1977 | Langere et al. | 252/313.1 |
| 4,028,266 | 6/1977 | Langere et al. | 252/313.1 |
| 4,217,240 | 8/1980 | Bergna | 252/634 X |
| 4,272,409 | 6/1981 | Bergna | 502/8 |
| 4,348,301 | 9/1982 | Crompton et al. | 252/313.1 |
| 4,351,741 | 9/1982 | Vogt | 252/313.1 |
| 4,608,198 | 8/1986 | Watanabe et al. | 252/609 |

*Primary Examiner*—Herbert B. Guynn
*Assistant Examiner*—Virginia B. Caress
*Attorney, Agent, or Firm*—Hal Brent Woodrow

[57] ABSTRACT

A process is disclosed for producing a powdered antimony pentoxide composition that rapidly disperses on contact with water. The process comprises spray drying the antimony sol at a temperature of from 180° to 210° F.

6 Claims, No Drawings

RAPIDLY DISPERSIBLE COMPOSITIONS OF ANTIMONY PENTOXIDE

The present invention pertains to powdered antimony pentoxide compositions which rapidly disperse when contacted with an aqueous medium. Another aspect of the invention pertains to a process for producing a rapidly dispersible powdered antimony pentoxide composition.

As shown by Langere et al in U.S. Pat. No. 4,026,819, issued May 31, 1977, it is well known in the art that antimony trioxide and antimony pentoxide are useful flame retardants. Although antimony pentoxide is the oxide of choice, commercially available antimony pentoxide powders suffer the disadvantage of a slow dispersion rate in water. This is a significant shortcoming because in a number of commercial applications, an aqueous antimony pentoxide sol is required.

Thus, a process that would produce a powdered antimony pentoxide that would rapidly disperse when contacted with an aqueous medium would represent a significant contribution to the art.

It is an object of the present invention to provide powdered antimony pentoxide compositions which will rapidly disperse when contacted with an aqueous medium.

It is a further object of the present invention to provide a process for producing powdered antimony pentoxide compositions which will rapidly disperse when contacted with an aqueous medium.

Other aspects, advantages and features of the invention will become apparent to those skilled in the art from the following discussion and appended claims.

In accordance with the present invention, it has been discovered that when an antimony pentoxide sol is spray dried at an inlet temperature range of from 180° F. to 210° F., there is produced a powdered antimony pentoxide composition that disperses within 90 seconds of when it is contacted with an aqueous medium.

The production of antimony pentoxide sols is well known to those skilled in the art. U.S. Pat. No. 4,026,819, issued to Langere et al, teaches a number of methods for producing these sols.

A preferred manner for producing the antimony pentoxide sols of the present invention is to admix antimony trioxide with water and hydrogen peroxide in the presence of heat. However, the present invention is suitable for use with any antimony pentoxide sol, regardless of the manner in which it is produced.

Optionally, the antimony pentoxide sols of the present invention can contain a stabilizer in the range of from 1 to 10 weight percent. Suitable stabilizers can be selected from the group consisting of alkanol amines, alpha-hydroxycarboxylic acid, polyhydroxy alcohols, or salts of alkanol amines. These stabilizers are well known to those skilled in the art and are available from numerous commercial suppliers. The presently preferred stabilizer is triethanolamine phosphate.

The preferred antimony pentoxide sols of the present invention will contain from 25 to 40 weight percent of antimony pentoxide, from 60 to 75 weight percent of water, and optionally, from 1-10 weight percent of a stabilizer based on the total weight of the antimony pentoxide sol.

The key to the practice of the present invention is to spray dry the antimony pentoxide sol at an inlet temperature range of from 180° F. to 210° F., which produces a powdered antimony pentoxide composition containing from 8 to 13 weight percent water and from 86 to 92 weight percent of antimony pentoxide. If a stabilizer is used in preparing the sol, then it will be present in the powdered composition in the range of from 0.01 to 1 percent. These compositions will readily disperse when contacted with an aqueous medium.

The process of the present invention is suitable for use with any of the spray dryers that are commercially available. It is immaterial whether the drying chamber of the spray dryer is equipped with a rotary atomizer, a pressure nozzle atomizer, or a two fluid nozzle atomizer. It is immaterial to the practice of the present invention whether the antimony sol is fed into the atomizer in a continuous or intermittent fashion. The flow rate and the pressure under which the sol is fed into the atomizer is immaterial to the practice of the present invention, provided that it is suitable for that particular spray dryer.

The flow rate and the pressure under which the antimony sol enters the drying chamber from the atomizer is also immaterial to the practice of the present invention provided that it is appropriate for that particular spray dryer.

The flow rate and the pressure under which the hot gases enter the drying chamber is also immaterial to the practice of the present invention, provided that the rate is appropriate for the chosen spray dryer. The manner in which these hot gases are generated is also not critical. They can be produced by electrical means, the combustion of fossil fuels, or any other manner conventionally used in the industry.

The following specific example is intended to illustrate the advantages of this invention, but is not intended to unduly limit this invention.

EXAMPLE I

The purpose of this example is to demonstrate that the powdered antimony pentoxide compositions of the present invention will rapidly disperse when they are contacted with an aqueous medium.

An antimony pentoxide sol was produced having the following composition:

TABLE I

| Material | Amount (in lbs) |
| --- | --- |
| Antimony Trioxide | 20.0 |
| Hydrogen Peroxide | 12.5 |
| Phosphoric Acid (85 wt %) | 1.2 |
| Triethanol amine | 4.5 |
| Distilled Water | 40.0 |

This mixture was then heated to 150° F. to 180° F. for 36 minutes. The triethanol amine and phosphoric acid react to form the stabilizer, triethanolamine phosphate, in situ within the reaction vessel. The resulting sol was then spray dried at temperatures ranging from 140° F. to 700° F.

The spray drier utilized had a pressure nozzle atomizer and is commercially available from Niro Atomizer Inc. of Columbia, Md.

The water content of the antimony compositions produced at these various temperatures was determined by the loss on ignition test.

In the loss on ignition test, 100 grams of the powdered antimony pentoxide composition was placed in a 1000° F. oven for 3 hours. The maerial was then reweighed and the difference represents the water that was present in the composition.

The ability of the powdered antimony composition to disperse in water was determined in the following manner. Two gram samples were placed in 100 ml of tap water that had been heated to 50° C. and were mechanically stirred. The time necessary for the powdered composition to dissolve and form a clear solution was determined visually. The following data was generated.

TABLE II

| Batch | Inlet Temp (°F.) | Water Content (wt %) | Dispersion Time (in seconds) |
|---|---|---|---|
| 1 (Control) | 140[1] | — | — |
| 2 (Invention) | 208 | 9.0 | 90 |
| 3 (Invention) | 200 | 10.2–11.2 | 40 |
| 4 (Invention) | 200 | 10–11 | 62 |
| 5 (Invention) | 200 | 10–11 | 40 |
| 6 (Control) | 480 | 2.2 | 190 |
| 7 (Control) | 700 | 1.0 | >540 |

[1]Batch #1, which was spray dried at 140° F., did not form a powder composition. Its dispersion time was not tested.

Batches #6 and 7 were spray dried at an inlet temperature of 480° and 700° F., respectively. They took from 190 to >540 seconds to disperse. Batch #1 which was spray dried at an inlet temperature of 140° F., did not form a powdered composition. It was still a liquid when it left the nozzle of the spray drier.

Batches #2–5 which were spray dried at an inlet temperature range of from 180° F. to 210° F., dispersed with a time period of from 40–90 seconds. Thus, this data demonstrates that when antimony pentoxide sols are spray dried at an inlet temperature ranging from 180° F. to 210° F., there is a dramatic improvement in the rate at which the resulting antimony powders redisperse in water.

Reasonable variations can be made in view of the foregoing disclosure without departing from the spirit or scope of the invention.

That which is claimed is:

1. In a process for producing a powdered antimony pentoxide composition by spray drying a sol containing 25 to 40 weight percent of antimony pentoxide; the improvement which comprises spray drying the antimony sol at an inlet temperature range of from 180° F. to 210° F.

2. The process of claim 1, wherein said antimony sol additionally contains from 1 to 10 weight percent of a stabilizer selected from the group consisting of alkanol amines, alpha-hydroxy carboxylic acids, polyhydroxy alcohols and salts of alkanol amines.

3. The process of claim 2, wherein said antimony sol contains 35 weight percent of antimony pentoxide, 8 weight percent of triethanolamine phosphate and 57 weight percent of water.

4. The product produced by the process of claim 1.

5. The product produced by the process of claim 2.

6. The product produced by the process of claim 3.

* * * * *